United States Patent
Day et al.

(10) Patent No.: US 8,887,141 B2
(45) Date of Patent: Nov. 11, 2014

(54) AUTOMATICALLY MODIFYING A NATIVE CODE MODULE ACCESSED FROM VIRTUAL MACHINE BYTECODE TO DETERMINE EXECUTION INFORMATION

(75) Inventors: Brian Day, Villa Park, IL (US); Daryl Hoyt, Aurora, IL (US)

(73) Assignee: Symantec Corporation, Mountain View, CA (US)

( * ) Notice: Subject to any disclaimer, the term of this patent is extended or adjusted under 35 U.S.C. 154(b) by 1718 days.

(21) Appl. No.: 11/863,828

(22) Filed: Sep. 28, 2007

(65) Prior Publication Data

US 2009/0089766 A1 Apr. 2, 2009

(51) Int. Cl.
*G06F 9/45* (2006.01)
*G06F 9/455* (2006.01)

(52) U.S. Cl.
CPC .................................. *G06F 9/45516* (2013.01)
USPC ........... 717/148; 717/140; 717/146; 717/151; 717/153

(58) Field of Classification Search
None
See application file for complete search history.

(56) References Cited

U.S. PATENT DOCUMENTS

| | | | |
|---|---|---|---|
| 6,425,014 B1 | 7/2002 | Aiken | |
| 6,886,157 B2 * | 4/2005 | Long et al. | 717/151 |
| 7,039,702 B1 | 5/2006 | Churchyard | |
| 7,194,735 B2 * | 3/2007 | Barclay | 717/148 |
| 7,240,335 B2 * | 7/2007 | Angel et al. | 717/130 |
| 7,263,690 B1 * | 8/2007 | Shapiro | 717/128 |
| 7,275,241 B2 * | 9/2007 | Choi et al. | 717/143 |
| 7,281,242 B2 | 10/2007 | Inamdar | |
| 7,293,260 B1 * | 11/2007 | Dmitriev | 717/130 |
| 7,353,504 B2 | 4/2008 | Lagergren | |
| 7,367,025 B1 | 4/2008 | Nikolov | |
| 7,401,324 B1 | 7/2008 | Dmitriev | |
| 7,421,682 B2 | 9/2008 | Viehland | |
| 7,426,717 B1 | 9/2008 | Schang | |
| 7,441,154 B2 | 10/2008 | Klotz | |
| 7,461,070 B2 | 12/2008 | Srivastava | |
| 7,464,161 B2 | 12/2008 | Chagoly | |
| 7,475,055 B2 | 1/2009 | Hutchison | |
| 7,475,214 B2 | 1/2009 | Hwang | |
| 7,475,388 B2 | 1/2009 | Fong | |
| 7,533,389 B2 | 5/2009 | Verbeke | |
| 2004/0133882 A1 | 7/2004 | Angel | |
| 2005/0223365 A1 | 10/2005 | Smith | |
| 2006/0136516 A1 | 6/2006 | Jain | |
| 2007/0011330 A1 | 1/2007 | Dinker | |
| 2007/0168670 A1 | 7/2007 | Dean | |
| 2007/0168998 A1 * | 7/2007 | Mehta et al. | 717/130 |
| 2007/0299944 A1 * | 12/2007 | Bodin et al. | 709/222 |
| 2008/0301710 A1 | 12/2008 | Shetty | |

OTHER PUBLICATIONS

Chen, et al. "Java JNI Bridge: A Framework for Mixed Native ISA Execution", 2006, IEEE, p. 1-11.*

(Continued)

*Primary Examiner* — Qamrun Nahar
(74) *Attorney, Agent, or Firm* — Meyertons Hood Kivlin Kowert & Goetzel (57) ABSTRACT

A system and method for automatically modifying a native code module accessed in a user software application are described herein. The user software application may include virtual machine bytecode. Access to the native code module may be detected during execution of the virtual machine bytecode. The native code module may be automatically modified by adding instrumentation code to determine various types of information regarding execution of the native code module, and the access may be directed to the modified native code module.

18 Claims, 4 Drawing Sheets

(56) References Cited

OTHER PUBLICATIONS

U.S. Appl. No. 11/861,852, entitled "Automatically Adding Bytecode to a Software Application to Determine Database Access Information", filed Sep. 27, 2007.

U.S. Appl. No. 11/862,359, entitled "Automatically Adding Bytecode to a Software Application to Determine Network Communication Information", filed Sep. 27, 2007.

"Introduction to Adaptive Instrumentation with Symantec Indepth™ for J2EE Application Performance Management," Symantec Corp., May 2006, http://eval.symantec.com/mktginfo/enterprise/white_papers/10574475_Indepth_wp_v3.pdf, p. 1-13.

"Nastel jKool™ Installation and User's Guide," Nastel Technologies, Inc., Jul. 2006, http://1885441442426375655-a-jkoolonline-com-s-sites.googlegroups.com/ a/jkoolonline.com/jkool-online/download/jkool_user_guide.pdf?attredirects=0&auth=ANoY7cqf8MWRbT3eGZ2mpDB2qJG-tllnhWW7bv04cYrX77InM9yPuHdZ4VgODwtBimYbn9SBQ-MDUX5pEstyPu74dk1l1WSAgo9jv3ajU9PuhvFxavYakVesgM-JIR5a2G-K3Z0OTU_OPMsHMB4QcEQnY0WyTNpqWRb0_gk-, p. 1-10.

"JDBC Connection Pool Counters", IBM Corp. This is a web page related to the IBM Websphere Application Server product. The web page is dated as being last updated on Nov. 24, 2008. However it is believed that the web page was online before the application was filed. The URL of the web page is: http://publib.boulder.ibm.com/infocenter/wasinfo/v6r0/topic/com.ibm.websphere.express.doc/info/exp/ae/rprf_datacounter2.html, p. 1-2.

"WLDF Instrumentation Library," BEA Systems, Inc. This is a web page related to the BEA WebLogic Server product. The web page has a copyright date of 2009. However it is believed that the web page was online before the application was filed. The URL of the web page is: http://edocs.bea.com/wls/docs91/wldf_configuring/appendix_instrum_library.html, p. 1-16.

* cited by examiner

AUTOMATICALLY MODIFYING A NATIVE CODE MODULE ACCESSED FROM VIRTUAL MACHINE BYTECODE TO DETERMINE EXECUTION INFORMATION

BACKGROUND OF THE INVENTION

1. Field of the Invention

This invention relates generally to computer software. More particularly, the invention relates to a system and method for intercepting programmatic access of a native code module performed during execution of virtual machine bytecode and modifying the native code module by adding additional code operable to determine information regarding execution of the native code module.

2. Description of the Related Art

Software developers typically create the source code for software applications in a high-level programming language by writing textual program statements that specify the application's functionality. The source code may then be compiled into executable machine code that can be executed by a physical processor. This executable machine code is also referred to as native code because it is formatted so that it executes on a specific type of processor using that processor's instruction set. Thus, native code is typically not portable across different types of computing devices, e.g., devices that use different types of processors.

An alternative method of program execution is to compile the source code into an intermediate form of code called bytecode, which is a binary representation of program instructions suitable for execution on a specific type of virtual machine. The virtual machine itself is implemented in software and is executed by the processor of the physical computing device. A software application that has been compiled into bytecode instructions may be executed on the virtual machine, e.g., by the virtual machine dynamically interpreting the bytecode instructions. Alternatively, another level of compilation may be performed. For example, some virtual machine runtime environments perform just-in-time compilation to compile bytecode into native code during execution of the software application.

The virtual machine provides a layer of abstraction between the compiled bytecode and the underlying hardware platform and operating system. Thus, compiling a software application into bytecode rather than native code may reduce the software application's dependence on specific hardware. For example, the same bytecode may be executed on several different types of computing platforms as long as a virtual machine to execute the bytecode is available on all the respective computing platforms.

While implementing a software application as virtual machine bytecode may have advantages in terms of portability, some tasks are impossible or inefficient to do in bytecode and can be done better using native code. Thus, some software applications use both hardware-independent virtual machine bytecode and native code compiled for a specific type of computing hardware or platform. For example, the software application may be implemented with bytecode where possible, and the bytecode may invoke native code routines when it is necessary to use features dependent on the host environment.

SUMMARY

Various embodiments of a system and method for automatically modifying a native code module accessed in a software application are described herein. The software application may include virtual machine bytecode. Access to the native code module may be detected during execution of the virtual machine bytecode. The native code module may be automatically modified in order to determine information regarding execution of the native code module, and the access may be directed to the modified native code module.

In various embodiments the native code module may be automatically modified in order to determine any of various kinds of information regarding execution of the native code module. For example, the native code module may be modified by adding additional code (referred to herein as "instrumentation code") operable to determine one or more of: profiling information for the native code module; debugging information for the native code module; tracing information for the native code module; monitoring information for the native code module; instrumentation information for the native code module; information regarding a programmatic call performed by the native code module; a parameter value passed in a programmatic call performed by the native code module; etc.

As further examples, the native code module may be modified by adding instrumentation code operable to determine one or more of: timing information for the native code module; invocation count information for the native code module; performance information for the native code module; memory usage information for the native code module; resource usage information for the native code module; network usage information for the native code module; database access information for the native code module; data used in the native code module; etc.

In some embodiments the method may further comprise receiving first virtual machine bytecode of the software application and automatically adding additional bytecode to the first bytecode, where the additional bytecode is operable to detect the access to the native code module and cause the modification of the native code module. For example, the additional bytecode may cause the modification of the native code module by invoking a software tool that performs the automatic modification of the native code module.

BRIEF DESCRIPTION OF THE DRAWINGS

A better understanding of the invention can be obtained when the following detailed description is considered in conjunction with the following drawings, in which.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for automatically modifying a native code module accessed in a user software application are described herein. For example, it may be desirable to automatically modify the native code module in order to determine or obtain various types of information regarding execution of the native code module, e.g., for monitoring or debugging purposes.

The user software application may be implemented using both virtual machine bytecode and native code. For example, the user software application may be implemented with bytecode where possible, and the bytecode may invoke native code routines when it is necessary to use features dependent on the host computing environment. As described below, the native code module may be dynamically modified during execution of the user software application, e.g., when the native code module is accessed by the virtual machine bytecode.

Figure 1:
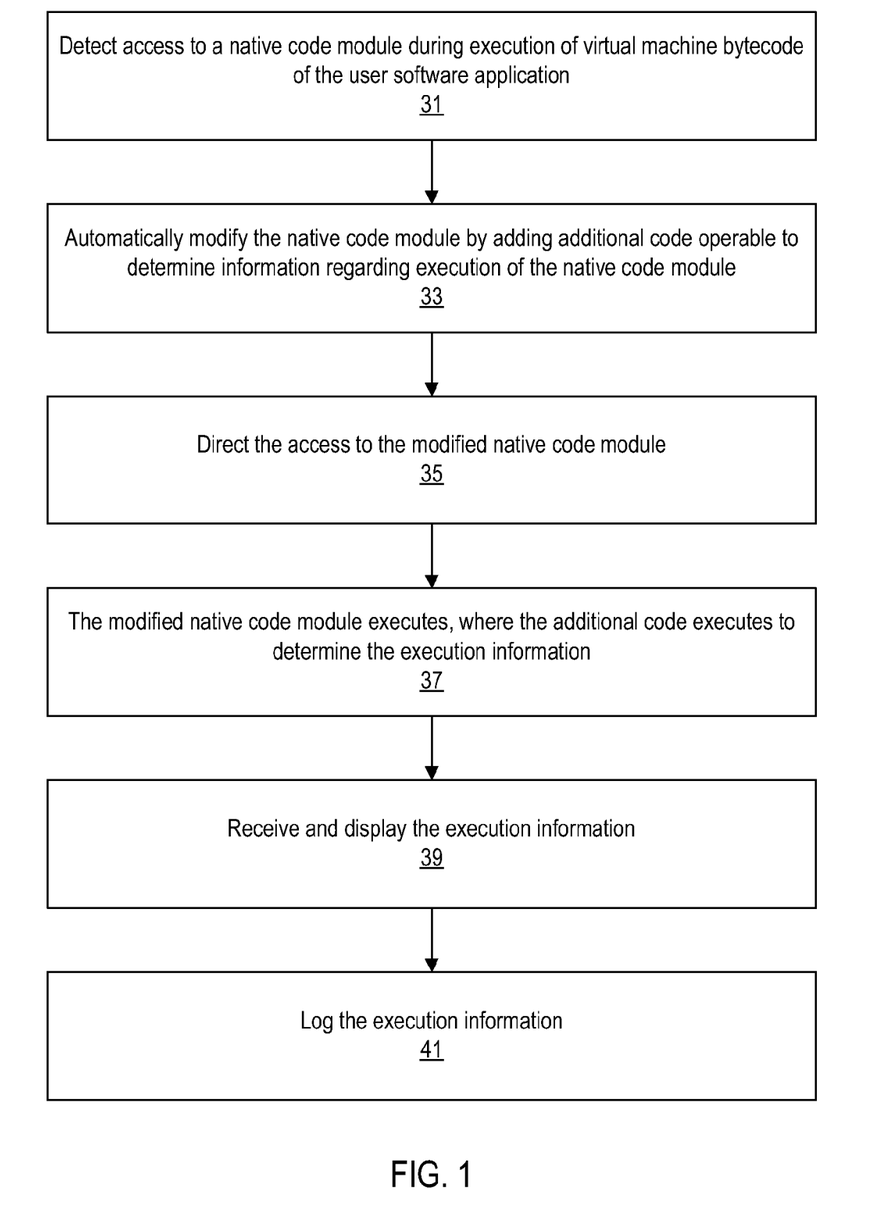
FIG. 1 illustrates one embodiment of the method for automatically modifying a native code module accessed from virtual machine bytecode of a user software application.

FIG. 1 is a flowchart diagram illustrating one embodiment of the method. As indicated in block 31, access to the native code module may be detected during execution of the virtual machine bytecode of the user software application. For example, the virtual machine bytecode may access the native code module by invoking execution of the native code module or a native code routine in the native code module, or may otherwise cause the native code module to be accessed or loaded.

As indicated in block 33, the native code module may be automatically modified by adding additional code operable to determine information regarding execution of the native code module. The additional code added to the native code module is referred to herein as instrumentation code. In various embodiments the instrumentation code may be operable to determine or obtain any of various kinds of information regarding execution of the native code module.

For example, the native code module may be modified by adding instrumentation code operable to determine one or more of: profiling information for the native code module; debugging information for the native code module; tracing information for the native code module; monitoring information for the native code module; instrumentation information for the native code module; information regarding a programmatic call performed by the native code module; a parameter value passed in a programmatic call performed by the native code module; etc.

As further examples, the native code module may be modified by adding instrumentation code operable to determine one or more of: timing information for the native code module; invocation count information for the native code module; performance information for the native code module; memory usage information for the native code module; resource usage information for the native code module; network usage information for the native code module; database access information for the native code module; data used in the native code module; etc.

In some embodiments, modifying the native code module may include automatically analyzing the native code module, e.g., in order to determine what additional code should be added to the native code module and/or where to add the additional code. Conventional techniques may be used to automatically analyze the native code module and add instrumentation code operable to determine execution information for the native code module.

As indicated in block 35, the method may further comprise directing the access detected in block 31 to the modified native code module. For example, the modified native code module or a routine within it may be executed, as indicated in block 37. Executing the modified native code module may include executing the instrumentation code that was added in block 33. The instrumentation code may execute to determine the execution information for the native code module.

The method may further comprise receiving and displaying the execution information determined by the instrumentation code, as indicated in block 39. For example, in some embodiments a presentation tool may receive the execution information and may display a graphical user interface on a display device, where the graphical user interface displays the execution information. The execution information may be displayed during execution of the user software application and/or after the execution has finished.

The method may also or may alternatively comprise logging or storing the execution information, as indicated in block 41. For example, after the execution information has been determined it may be written to a log file or stored in a database for future access.

Figure 2:
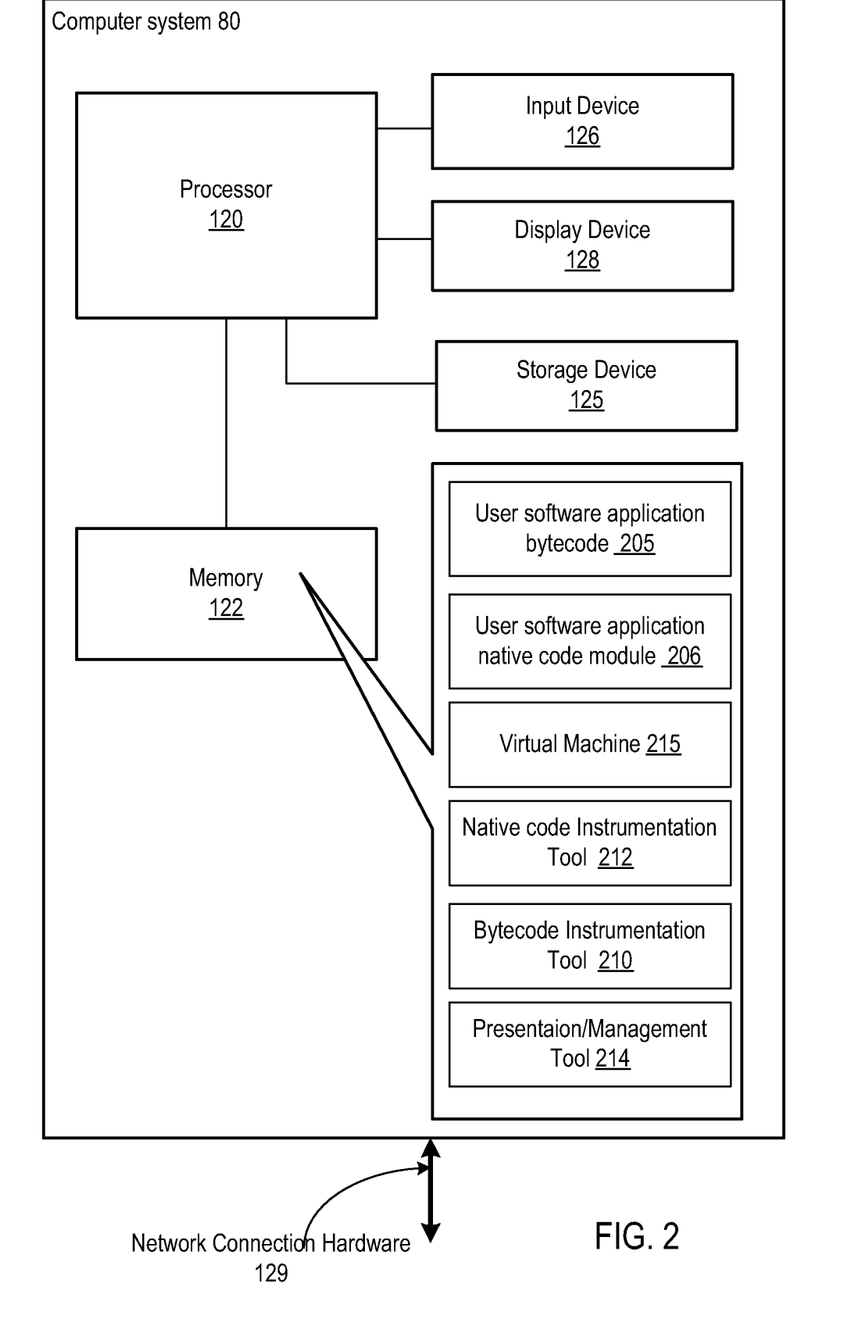
FIG. 2 illustrates one embodiment of a computer system configured to implement the method of FIG. 1.

FIG. 2 illustrates one embodiment of a computer system 80 that is configured to implement the method of FIG. 1. In various embodiments the computer system 80 may comprise any type of computer system. The computer system 80 may include one or more processors 120 coupled to memory 122. In some embodiments, the memory 122 may include one or more forms of random access memory (RAM) such as dynamic RAM (DRAM) or synchronous DRAM (SDRAM). However, in other embodiments the memory 122 may include any other type of memory instead or in addition.

The memory 122 may be configured to store program instructions and/or data. In particular, the memory 122 may store bytecode 205 for a user software application, e.g., a software application created by a user (e.g., an application developer). In various embodiments the bytecode 205 may comprise any type of bytecode, e.g., may comprise bytecode configured to execute on any of various types of virtual machines. For example, in some embodiments the bytecode 205 may comprise Java bytecode, e.g., bytecode for a Java Virtual Machine (a virtual machine constructed in accordance with a published Java Virtual Machine specification). As another example, in some embodiments the bytecode 205 may comprise Common Intermediate Language (CIL) bytecode for a Common Language Runtime (CLR) virtual machine, such as bytecode for a Microsoft .NET software application.

The memory 122 may also store one or more native code modules 206 used in the user software application. As used herein, the term "native code module" refers to a software module, component, or routine that includes native code. The term "native code" refers to program instructions compiled for execution by physical hardware, e.g., as opposed to being compiled for execution by a virtual machine. Examples of native code modules include native code libraries, native code software components, native code classes, native code methods, and native code functions.

One or more of the native code modules 206 may be modified with instrumentation code operable to determine execution information. For example, in some embodiments a native code module 206 may be modified at the time it is loaded for use by the user software application, e.g., where the native code module 206 is invoked from the bytecode 205 of the user software application.

In some embodiments the memory 122 may also store a virtual machine 215. The virtual machine 215 may execute or interpret the bytecode 205 of the user software application. In other embodiments, the bytecode 205 may be dynamically converted to native code and executed directly by the processor 120. For example, in some embodiments the bytecode 205 may be compiled into native code using a just-in-time compilation technique that compiles portions of the bytecode 205 into native code as needed during execution of the user software application.

In some embodiments the memory 122 may also store a native code instrumentation tool 212. The native code instrumentation tool 212 may be operable to automatically analyze a native code module 206 and modify the native code module 206 by adding instrumentation code operable to determine or obtain information regarding execution of the native code module 206. The native code instrumentation tool 212 may be invoked during execution of the user software application, e.g., may be invoked to automatically modify a respective native code module 206 when the bytecode 205 of the user software application programmatically accesses the respective native code module 206.

In some embodiments the memory 122 may also store a bytecode instrumentation tool 210. The bytecode instrumentation tool 210 may be operable to receive bytecode 205 and automatically modify the bytecode 205 by adding additional bytecode, where the additional bytecode is operable to detect access of a native code module 206 by the bytecode 205 and cause the native code module 206 be automatically modified by adding instrumentation code for determining execution information for the native code module 206. For example, the additional bytecode may invoke the native code instrumentation tool 212, which performs the modification of the native code module 206. In an embodiment in which the bytecode 205 comprises Java bytecode, the bytecode instrumentation tool 210 may utilize Java bytecode instrumentation techniques to automatically add the bytecode that performs the functionality of detecting the access to the native code module and invoking the native code instrumentation tool 212.

In some embodiments the memory 122 may also store a presentation/management tool 214. When a modified native code module 206 is executed, the instrumentation code added to the native code model 206 may determine various kinds of execution information regarding execution of the native code module 206. The presentation/management tool 214 may receive the execution information and perform various functions such as displaying the execution information in a graphical user interface, logging the execution information, etc. For example, displaying or logging the execution information may enable a user to monitor or debug execution of the native code module 206. In some embodiments the presentation/management component 214 may also be operable to display a configuration user interface that allows the user to specify what types of execution information should be automatically determined or other options affecting the determination of the execution information and may communicate with the native code instrumentation tool 212 to pass this information and configure it to modify native code modules 206 accordingly.

Referring again to FIG. 1, it is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the computer system 80 may include multiple processors 120.

The computer system 80 also includes or is coupled to one or more storage devices 125. In various embodiments the storage devices 125 may include any of various kinds of storage devices operable to store data, such as optical storage devices, disk drives, tape drives, flash memory devices, etc. As one example, the storage devices 125 may be implemented as one or more disk drives configured independently or as a disk storage system. In some embodiments the storage devices 125 may store representations of the user software application bytecode 205, native code modules 206, and various other components before these components are loaded into the memory 122, and/or the storage devices 125 may store portions of these components paged out from the memory 122 using paging techniques.

The computer system 80 may also include one or more input devices 126 for receiving user input from a user of the computer system 80. The input device(s) 126 may include any of various types of input devices, such as keyboards, keypads, microphones, or pointing devices (e.g., a mouse or trackball). The computer system 80 may also include one or more output devices 128 for displaying output to the user. The output device(s) 128 may include any of various types of output devices or display devices, such as LCD screens or monitors, CRT monitors, etc.

In some embodiments the computer system 80 may also include network connection hardware 129 through which the computer system 80 connects to a network. The network connection hardware 129 may include any type of hardware for coupling the computer system 80 to the network, e.g., depending on the type of network. In various embodiments, the computer system 80 may be coupled to any type of network or combination of networks.

Figure 3:
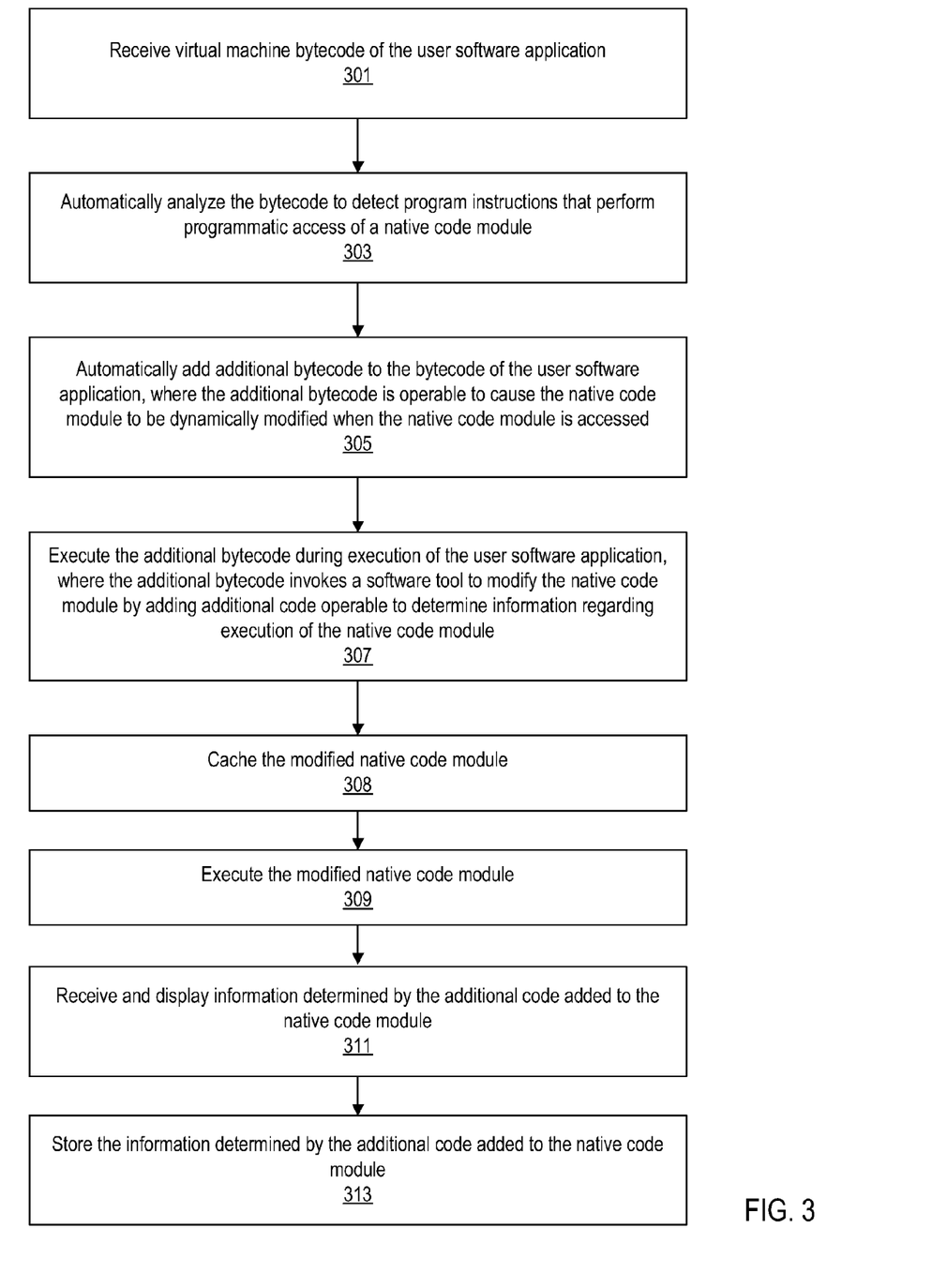
FIG. 3 is a flowchart diagram illustrating a more particular embodiment of the method of FIG. 1.

FIG. 3 is a flowchart diagram illustrating a more particular embodiment of the method of FIG. 1. It is noted that the blocks illustrated in FIG. 3 may be performed in various orders, and various blocks may be performed concurrently or repeatedly.

In 301, virtual machine bytecode 205 of the user software application may be received by the bytecode instrumentation tool 210.

In 303, the bytecode instrumentation tool 210 may automatically analyze the bytecode 205 to detect program instructions that perform programmatic access of a native code module 206. For example, the bytecode instrumentation tool 210 may detect loading of the native code module or invocation of a routine in the native code module.

The access to the native code module 206 may be detected in various ways, e.g., depending on the particular type of bytecode 205. In some embodiments, detecting the access may comprise detecting one or more programmatic calls (e.g., function calls or method calls) that access the native code module 206. In some embodiments the bytecode 205 may be implemented on a virtual computing platform that provides an interface for invoking native code modules, and the access to the native code module 206 may be detected by detecting use of the interface. For example, in some embodiments the bytecode 205 may include Java bytecode that accesses the native code module 206 through Java Native Interface (JNI), and the access to the native code module 206 may be detected by detecting use of the Java Native Interface.

In 305, the bytecode instrumentation tool 210 may automatically add additional bytecode to the bytecode 205 of the user software application, where the additional bytecode is operable to cause the native code module 206 to be dynamically modified when the native code module 206 is accessed by the bytecode 205.

As indicated in 307, the additional bytecode added to the bytecode 205 may be executed during execution of the user software application, e.g., may be executed in response to or just prior to the bytecode 205 attempting to access the native code module 206. The additional bytecode may execute to invoke the native code instrumentation tool 212, which may automatically modify the native code module 206 by adding instrumentation code operable to determine various types of information regarding execution of the native code module 206.

In some embodiments the native code module 206 may be cached after it has been modified by the native code instrumentation tool 212. Caching the modified native code module 206 may enable the modified native code module 206 to be reused for future access without needing to re-modify the native code module 206, thus providing performance advantages.

The access request that was detected by the additional bytecode in block 307 may be directed to the modified native code module 206, and the modified native code module 206 may be executed, as indicated in 309. Executing the modified native code module 206 may include executing the instrumentation code added by the native code instrumentation tool 212. As described above, the instrumentation code may execute to determine information regarding the execution of the modified native code module 206.

As indicated in 311, the presentation/management tool 214 may receive and display the execution information determined by the instrumentation code added to the native code module, and/or the presentation/management tool 214 may store the execution information, e.g., in a log file or database.

In various embodiments, the functionality of analyzing the bytecode 205 of the user software application and adding the additional bytecode as described above with reference to blocks 303 and 305 of FIG. 3 may be performed in any of various ways. For example, in some embodiments the additional bytecode may be statically added to the previously existing bytecode 205 before the user software application is launched for execution.

In other embodiments, the additional bytecode may be dynamically added to the previously existing bytecode 205 during execution of the user software application. For example, in some embodiments, the user software application may utilize object-oriented classes, where the classes may be dynamically loaded during execution of the user software application. When a class is loaded, the class may be automatically analyzed to detect whether the class or a method in the class accesses a native code module 206. If so, then the bytecode that implements the class may be automatically modified, e.g., by adding additional bytecode that invokes the native code instrumentation tool 212 to modify the native code module 206 when the native code module 206 is accessed.

Figure 4:
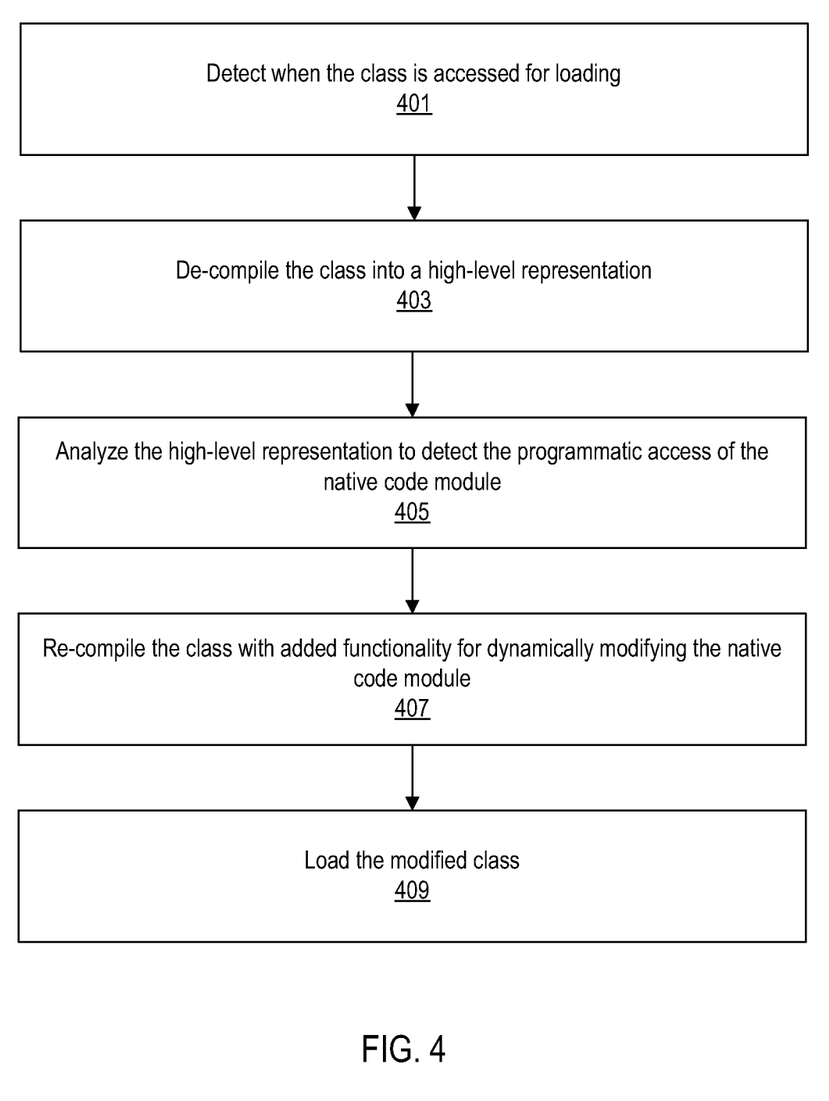
FIG. 4 is a flowchart diagram illustrating one embodiment of a method for dynamically adding additional bytecode to an object-oriented class used by the user software application.

FIG. 4 is a flowchart diagram illustrating one embodiment of a method for dynamically adding the additional bytecode to an object-oriented class used by bytecode 205 of the user software application.

In 401, the method of FIG. 4 may detect when the class is accessed for loading. For example, in some embodiments a class loader module may access the class when the class is needed during execution of the user software application.

In response to detecting the access of the class, the method of FIG. 4 may operate to de-compile the class into a high-level representation. For example, the class may be de-compiled into source code or into tokens or structures representative of source code from which the bytecode of the class was created.

In 405, the high-level representation may be automatically analyzed in order to detect programmatic access to the native code module 206. For example, in some embodiments the high-level representation may be analyzed to detect whether the class includes one or more methods that utilize a native code interface for invoking native code modules.

In 407, the class may be re-compiled with added functionality to intercept the request to access the native code module 206 and invoke the native code instrumentation tool 212 to modify the native code module 206 before it is loaded. For example, source code or other information for performing this functionality may be added to the high-level representation, and the class may then be re-compiled so that it includes the added functionality. Thus, re-compiling the class may produce the additional bytecode that intercepts the request to access the native code module 206 and invokes the native code instrumentation tool 212.

In 409, the modified class may be loaded. Thus, when the bytecode of the class executes, the additionally added bytecode that intercepts the request to access the native code module 206 and invokes the native code instrumentation tool 212 may also execute.

As noted above, in some embodiments, the bytecode of the user software application may be bytecode constructed for execution on a Java Virtual Machine (JVM). When a Java class is loaded during execution of the user software application, the class may be analyzed in order to determine whether any of the methods in the class access a native code module, e.g., by loading a native code library or invoking a method in a native code library through the Java Native Interface (JNI). For each respective method that accesses a native code module, the bytecode that implements the method may be automatically modified by adding additional bytecode operable to intercept the request to access the native code module and invoke the native code instrumentation tool 212 in order to modify the native code module with instrumentation code as described above. For example, Java bytecode instrumentation techniques may be used to automatically add the additional bytecode.

Thus, when the method of the class is executed the additional bytecode may intercept the request to access the native code module, invoke the native code instrumentation tool 212 to modify the native code module, and cause the access request to be directed to the modified native code module. When the modified native code module executes, the instrumentation code that was added by the native code instrumentation tool 212 may determine information regarding execution of the native code module. This execution information may be displayed on a graphical user interface or logged, e.g., where the execution information enables a user to monitor or debug the execution of the native code module.

It is noted that various embodiments may further include receiving, sending or storing instructions and/or data implemented in accordance with the foregoing description upon a computer-accessible storage medium. Generally speaking, a computer-accessible storage medium may include any storage media accessible by a computer during use to provide instructions and/or data to the computer. For example, a computer-accessible storage medium may include storage media such as magnetic or optical media, e.g., disk (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A tangible, non-transitory computer-accessible storage medium storing program instructions executable by one or more processors to:
    analyze virtual machine bytecode of a software application to detect access by the bytecode to a native code module, wherein the software application includes at least one object-oriented class;
    wherein to detect access by the bytecode to the native code module, the at least one object-oriented class is analyzed responsive to the at least one object-oriented class being loading during execution of the software application;
    in response to said detecting the access by the bytecode to the native code module, automatically modify the bytecode by adding additional bytecode to the software application, wherein the additional bytecode is executable to automatically modify the native code module by adding additional native code to the native code module, wherein the additional native code is executable to determine information regarding execution of the native code module during execution of the software application.

2. The computer-accessible storage medium of claim 1, wherein the additional bytecode is executable to invoke a software tool that performs the automatic modification of the native code module.

3. The computer-accessible storage medium of claim 1, wherein the program instructions are further executable by the one or more processors to execute the additional bytecode during execution of the software application, wherein the additional bytecode executes to add the additional native code to the native code module.

4. The computer-accessible storage medium of claim 3, wherein executing the additional bytecode comprises executing the additional bytecode on a virtual machine.

5. The computer-accessible storage medium of claim 1, wherein the program instructions are executable by the one or more processors to add the additional bytecode to the software application during execution of the software application.

6. The computer-accessible storage medium of claim 1, wherein the program instructions are executable by the one or more processors to add the additional bytecode to the software application prior to execution of the software application.

7. The computer-accessible storage medium of claim 1, wherein the software application includes bytecode implementing a first method;
    wherein automatically adding the additional bytecode to the software application comprises automatically inserting at least a portion of the additional bytecode into the bytecode implementing the first method.

8. The computer-accessible storage medium of claim 1, wherein the native code module comprises one or more of:
    a native code library;
    a native code software component;
    a native code method;
    a native code function.

9. The computer-accessible storage medium of claim 1, wherein detecting the access to the native code module comprises one or more of:
    detecting loading of a native code library;
    detecting invocation of a native code routine.

10. The computer-accessible storage medium of claim 1, wherein the additional native code is executable to determine one or more of:
    profiling information for the native code module;
    debugging information for the native code module;
    tracing information for the native code module;
    monitoring information for the native code module;
    instrumentation information for the native code module;
    information regarding a programmatic call performed by the native code module;
    a parameter value passed in a programmatic call performed by the native code module.

11. The computer-accessible storage medium of claim 1, wherein the additional native code is executable to determine one or more of:
    timing information for the native code module;
    invocation count information for the native code module;
    performance information for the native code module;
    memory usage information for the native code module;
    resource usage information for the native code module;
    network usage information for the native code module;
    database access information for the native code module;
    data used in the native code module.

12. The computer-accessible storage medium of claim 1, wherein the program instructions are further executable to execute the modified native code module, wherein the additional native code added to the native code module executes to determine the information regarding the execution of the native code module.

13. The computer-accessible storage medium of claim 12, wherein the program instructions are further executable by the one or more processors to:
    display on a display device the information determined by the additional native code added to the native code module.

14. The computer-accessible storage medium of claim 1, wherein the program instructions are further executable by the one or more processors to:
    cache the modified native code module.

15. The computer-accessible storage medium of claim 1, wherein the virtual machine bytecode of the software application comprises bytecode for a Java Virtual Machine (JVM).

16. The computer-accessible storage medium of claim 1, wherein the virtual machine bytecode of the software application comprises bytecode for a Common Language Runtime (CLR) virtual machine.

17. A system comprising:
    one or more processors; and
    memory storing program instructions;
    wherein the program instructions are executable by the one or more processors to:
    analyze virtual machine bytecode of a software application to detect access by the bytecode to a native code module, wherein the software application includes at least one object-oriented class;
    wherein to detect access by the bytecode to the native code module, the at least one object-oriented class is analyzed responsive to the at least one object-oriented class being loading during execution of the software application;
    in response to said detecting the access by the bytecode to the native code module, automatically modify the bytecode by adding additional bytecode to the software application, wherein the additional bytecode is executable to automatically modify the native code module; and execute the software application, wherein in executing the software application the program instructions are executable by the one or more processors to:
  execute the additional bytecode added to the software application, wherein the additional bytecode executes to automatically modify the native code module by adding additional native code to the native code module, wherein the additional native code is executable to determine information regarding execution of the native code module; and
  execute the modified native code module.

18. A method comprising:
  a computer system analyzing virtual machine bytecode of a software application to detect access by the bytecode to a native code module, wherein the software application includes at least one object-oriented class;
  wherein to detect access by the bytecode to the native code module, the at least one object-oriented class is analyzed responsive to the at least one object-oriented class being loading during execution of the software application;
  in response to said detecting the access by the bytecode to the native code module, the computer system automatically modifying the bytecode by adding additional bytecode to the software application, wherein the additional bytecode is executable to automatically modify the native code module; and
  the computer system executing the software application, wherein said executing the software application comprises:
    executing the additional bytecode added to the software application, wherein the additional bytecode executes to automatically modify the native code module by adding additional native code to the native code module, wherein the additional native code is executable to determine information regarding execution of the native code module; and
    executing the modified native code module.

* * * * *